(No Model.)
W. DEETZ.
MACHINE FOR REMOVING SNOW FROM RAILROAD CUTS.
No. 262,537. Patented Aug. 8, 1882.
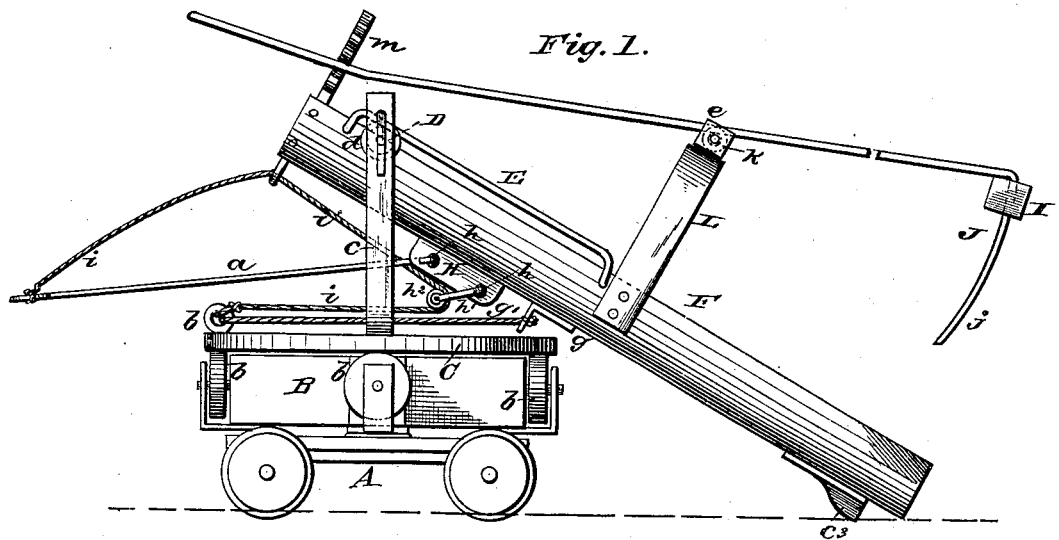
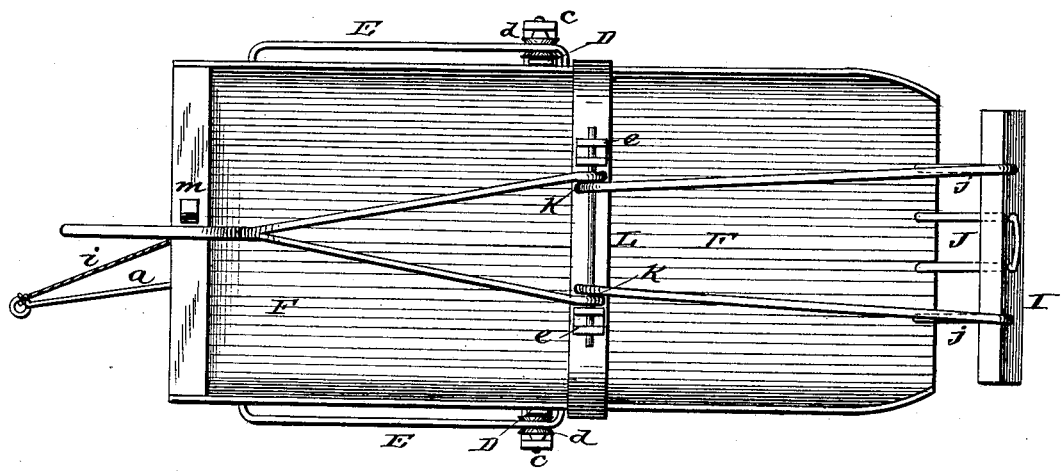
WITNESSES:
Fred. G. Dieterich
P. C. Dieterich
INVENTOR.
Wm. Deetz
per N. W. Fitzgerald &c.
ATTORNEYS.
N. PETERS. Photo-Lithographer. Washington, D. C.

UNITED STATES PATENT OFFICE.

WILLIAM DEETZ, OF SPAFFORD, WISCONSIN.

MACHINE FOR REMOVING SNOW FROM RAILROAD-CUTS.

SPECIFICATION forming part of Letters Patent No. 262,537, dated August 8, 1882.

Application filed April 12, 1882. (No model.)

*To all whom it may concern:*

Be it known that I, WILLIAM DEETZ, a citizen of the United States, residing at Spafford, in the county of La Fayette and State of Wisconsin, have invented certain new and useful Improvements in Machines for Removing Snow from Railroad-Cuts; and I do hereby declare the following to be a full, clear, and exact description of the invention, such as will enable others skilled in the art to which it appertains to make and use the same.

This invention relates to a novel construction of machine mounted upon a platform-car to be used for cleaning snow from railroad-tracks whenever the same becomes blockaded by drifts; and the invention consists in novel features of construction and combination and arrangement of parts, all as will be hereinafter fully described, and set forth in the claims hereto annexed.

Referring to the accompanying drawings, Figure 1 represents a side elevation of my improved machine in position for operation; Fig. 2, a top view or plan of the same when the operating parts have been run backward and in position for being turned to dump its load.

In the drawings, A represents an ordinary platform-car, upon which is secured a base portion, B, provided with friction-wheels $b$, upon which rests a circular plate, C, provided with uprights $c\ c$, having secured thereto, near the upper ends, guides D D for the reception of the projecting longitudinal bails E E, secured to the snow-scoop F, and projecting from said scoop near its upper and outer sides, and near the rear end thereof, which bails rest on friction-rollers $d\ d$, arranged in said guides D D in any suitable manner so that the scoop may be run forward or drawn backward, for purposes hereinafter described.

On the under side of the scoop, near its opposite sides, are arranged two plates, $g\ g$, only one of which is shown in the drawings, to which a stay-cord, $g'$, is secured, that passes backward through a perforated standard, $b'$, on the circular plate C for the purpose of preventing the front end of the scoop from being forced too far forward when lowering the scoop.

$c^3$ are the flanges attached to the scoop, and which rest on the rails of the track when the machine is being driven into the snow.

H represents a plate secured to the under side of the scoop, and which is provided with two holes, $h\ h$, through it, in the forward one of which is arranged a swinging bail, $h'$, carrying a friction-roller, $h^2$, over which passes a cord, $i$, secured at one end to the perforated standard $b'$, while its other end passes through an eye-bolt at upper end of scoop, and is connected to a wire rod, $a$, at one end, which wire is hooked and secured in the rear slot of the plate H.

J is the cut-off for the scoop, consisting of prongs or flattened tines $j$, projecting down through a head, I, the outer tines being formed from a single wire, which projects rearwardly, and has loops $k\ k$, through which passes a transverse rod arranged to pass through projecting perforated lugs $e\ e$, arranged on the upper side of the arched standard L, connected to said scoop. The wire continues still rearward, forming a handle for the cut-off, which, when raised during the operation of loading, is secured in position by engaging a notched standard, $m$, all as clearly shown in Fig. 1.

The operation of the above-described machine is as follows: When the track is obstructed by snow-drifts the car, with the snow-cleaning devices, is placed in front of the locomotive and the scoop lowered until it is stopped by the stay-cord $g'$. In this position it is driven into the bank, the snow entering and filling the scoop. The cut-off is then disconnected, when it will fall by its own weight and cut off the proper load for the scoop. The scoop is then drawn by the rope $i$ backward on the bails E E, resting on the friction-rollers $d\ d$, until it assumes a horizontal position, when, through the medium of the cord $i$ and hooked rod $a$, the scoop can be turned by the circular plate moving freely around on the friction-wheels $b$ until the scoop is in position to dump the load to one side of the track, when it can be raised by the cord $i$ and turned around to its original position, when, upon releasing the scoop, it will fall by its own weight, after which the cut-off is raised and secured, as before presented, when the machine is again ready for repeating its operation.

The above-described machine is simple in construction and effective in operation, and further description is deemed unnecessary.

Having thus fully described my invention, what I claim as new, and desire to secure by Letters Patent, is—

1. The combination, with the base portion B, provided with friction-wheels b, of the circular plate C, having vertical standards c c, provided with guides D D, and the scoop F, provided with the longitudinal side bails, E E, adapted to be moved in said guides, substantially as and for the purpose specified.

2. The combination of the scoop having the arched standard L, provided with perforated lugs e e and a transverse rod, the cut-off J, consisting of a head, I, having a series of projecting tines, its outer tines or forks, j j, extended rearward, and having eye-loops k k, by which the cut-off is journaled on the transverse rod, and a projecting handle formed from said tines j j, extending rearward for operating the cut-off, substantially as herein shown and described.

3. The combination, with the base B, provided with friction-wheels b, of the circular plate C, having vertical standards c c, provided with guides D D, the scoop F, provided with the longitudinal bails E E and a pivoted cut-off, and means, substantially as described, for moving said scoop over rearwardly and turning it around to dump it, substantially as specified.

In testimony whereof I affix my signature in presence of two witnesses.

WILLIAM DEETZ.

Witnesses:
JOHN COLLINS,
M. W. RICHARDSON.